(12) United States Patent
Eslami (10) Patent No.: US 9,699,371 B1
(45) Date of Patent: Jul. 4, 2017

(54) IMAGE PROCESSING SYSTEM WITH SALIENCY INTEGRATION AND METHOD OF OPERATION THEREOF

(71) Applicant: Sony Corporation, Tokyo (JP)

(72) Inventor: Ramin Eslami, Milpitas, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/083,901

(22) Filed: Mar. 29, 2016

(51) Int. Cl.
*H04N 5/232* (2006.01)
*G06K 9/32* (2006.01)
*G06T 7/20* (2017.01)

(52) U.S. Cl.
CPC ....... *H04N 5/23212* (2013.01); *G06K 9/3241* (2013.01); *G06T 7/2066* (2013.01)

(58) Field of Classification Search
None
See application file for complete search history.

(56) References Cited

U.S. PATENT DOCUMENTS

| | | | |
|---|---|---|---|
| 8,891,009 B2 | 11/2014 | Lu et al. | |
| 9,195,903 B2 | 11/2015 | Andreopoulos et al. | |
| 2009/0304231 A1* | 12/2009 | Lu | G06K 9/3233 382/103 |
| 2010/0045800 A1* | 2/2010 | Chebil | G03B 13/36 348/169 |
| 2012/0051730 A1* | 3/2012 | Cote | G03B 3/10 396/90 |
| 2012/0057786 A1* | 3/2012 | Yano | H04N 5/232 382/170 |
| 2015/0016683 A1* | 1/2015 | Kinoshita | H04N 5/23219 382/103 |
| 2015/0055824 A1* | 2/2015 | Hong | G06K 9/00624 382/103 |
| 2016/0086052 A1* | 3/2016 | Piekniewski | G06T 7/0065 382/103 |
| 2016/0093064 A1* | 3/2016 | Kobayashi | G06K 9/00362 382/103 |
| 2016/0094774 A1* | 3/2016 | Li | H04N 5/23212 348/222.1 |

(Continued)

FOREIGN PATENT DOCUMENTS

CN         103632372 A         3/2014

OTHER PUBLICATIONS

Ho-Phuoc et al., "A Compact Saliency Model for Video-Rate Implementation", "IEEE", 2011, pp. 244-248, Asilomar 2011; Grenoble, France.

*Primary Examiner* — Shahbaz Nazrul
(74) *Attorney, Agent, or Firm* — Haverstock & Owens LLP (57) ABSTRACT

An image processing system, and a method of operation of an image processing system thereof, including: a capture device for capturing a first input image frame and a second input image frame; a motion saliency module, coupled to the capture device, for generating a motion saliency frame based on the first input image frame and the second input image frame; a spatial saliency module, coupled to the capture device, for generating a spatial saliency frame based on the second input image frame; and a saliency integration module, coupled to the motion saliency module and the spatial saliency module, for generating the integrated saliency frame based on the combination of the motion saliency frame and the spatial saliency frame, and for determining a region of interest within the integrated saliency frame.

20 Claims, 6 Drawing Sheets

(56) References Cited

U.S. PATENT DOCUMENTS

2016/0300117 A1* 10/2016 Yamamoto ........... G06K 9/3241
2017/0006211 A1*  1/2017 Gurbuz ................ H04N 5/2226
2017/0054897 A1*  2/2017 Shanmugam ...... H04N 5/23212

* cited by examiner

IMAGE PROCESSING SYSTEM WITH SALIENCY INTEGRATION AND METHOD OF OPERATION THEREOF

TECHNICAL FIELD

The present invention relates generally to an image processing system, and more particularly to a system for saliency integration of an image or series of images.

BACKGROUND ART

Digital cameras, whether embedded in other devices, or standalone cameras, rely heavily on automatic detection of where to focus in order to be user-friendly for the widest customer base possible. Autofocus and other automatic functions within a camera rely on automatic detection of what a user is likely to be interested in.

Current solutions can place too much weight on one factor or another in order to determine what portion of a given image frame is appropriate to focus on. This is sometimes called detection of salient objects within images. While focusing on one aspect of objects within an image frame, it is easy for a camera or image processing software to overlook other aspects of the image which may be just as interesting to a user, if not more interesting. One cannot simply take disparate approaches and stick them together, especially when the approaches have different methodologies.

Thus, a need still remains for a better saliency detection method. In view of the rapid increase in picture and video taking and sharing, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system that includes capturing a first input image frame and a second input image frame with a capture device; generating a motion saliency frame based on the first input image frame and the second input image frame; generating a spatial saliency frame based on the second input image frame; generating the integrated saliency frame based on the combination of the motion saliency frame and the spatial saliency frame; and determining a region of interest within the integrated saliency frame.

The present invention provides an image processing system that includes a capture device for capturing a first input image frame and a second input image frame; a motion saliency module, coupled to the capture device, for generating a motion saliency frame based on the first input image frame and the second input image frame; a spatial saliency module, coupled to the capture device, for generating a spatial saliency frame based on the second input image frame; and a saliency integration module, coupled to the motion saliency module and the spatial saliency module, for generating the integrated saliency frame based on the combination of the motion saliency frame and the spatial saliency frame, and for determining a region of interest within the integrated saliency frame.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, dedicated circuitry for a specific function, a processor, a computer, an integrated circuit, integrated circuit cores, a microelectromechanical system (MEMS), passive devices, environmental sensors including temperature sensors, or a combination thereof.

Figure 1:
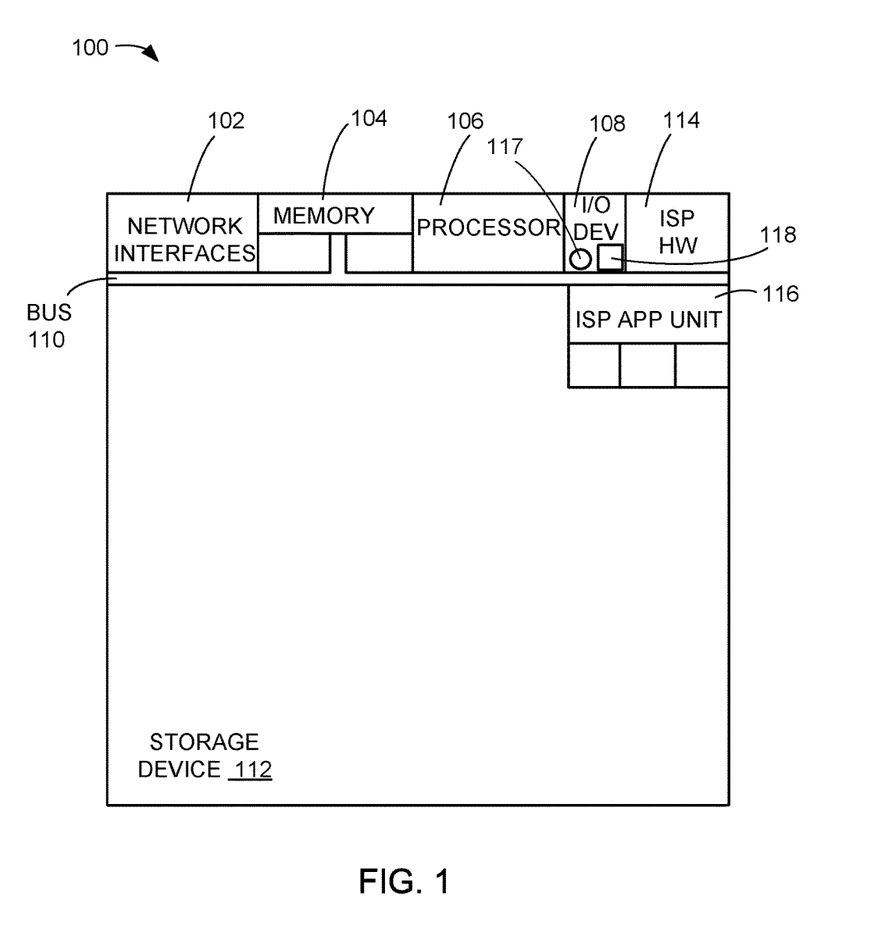
FIG. 1 is an example of a block diagram of an image processing system with saliency integration in a first embodiment of the present invention.

Referring now to FIG. 1, therein is shown an example of a block diagram of an image processing system 100 with saliency integration in a first embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of wired or wireless local area networks (LAN). As specific examples, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-Shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video or pictures. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projection, CRT, or other display technologies.

Whether capturing video or still pictures, when activated, the capture device 117 can be continuously capturing video which can be considered as a series of images, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns. For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118 which can display resulting video.

Regardless of how the capture device 117, the processor 106, and the display devices 118 are connected, the display devices 118 can output a processed image or processed video after processing of the input image or images by the image signal processing hardware 114.

Figure 2:
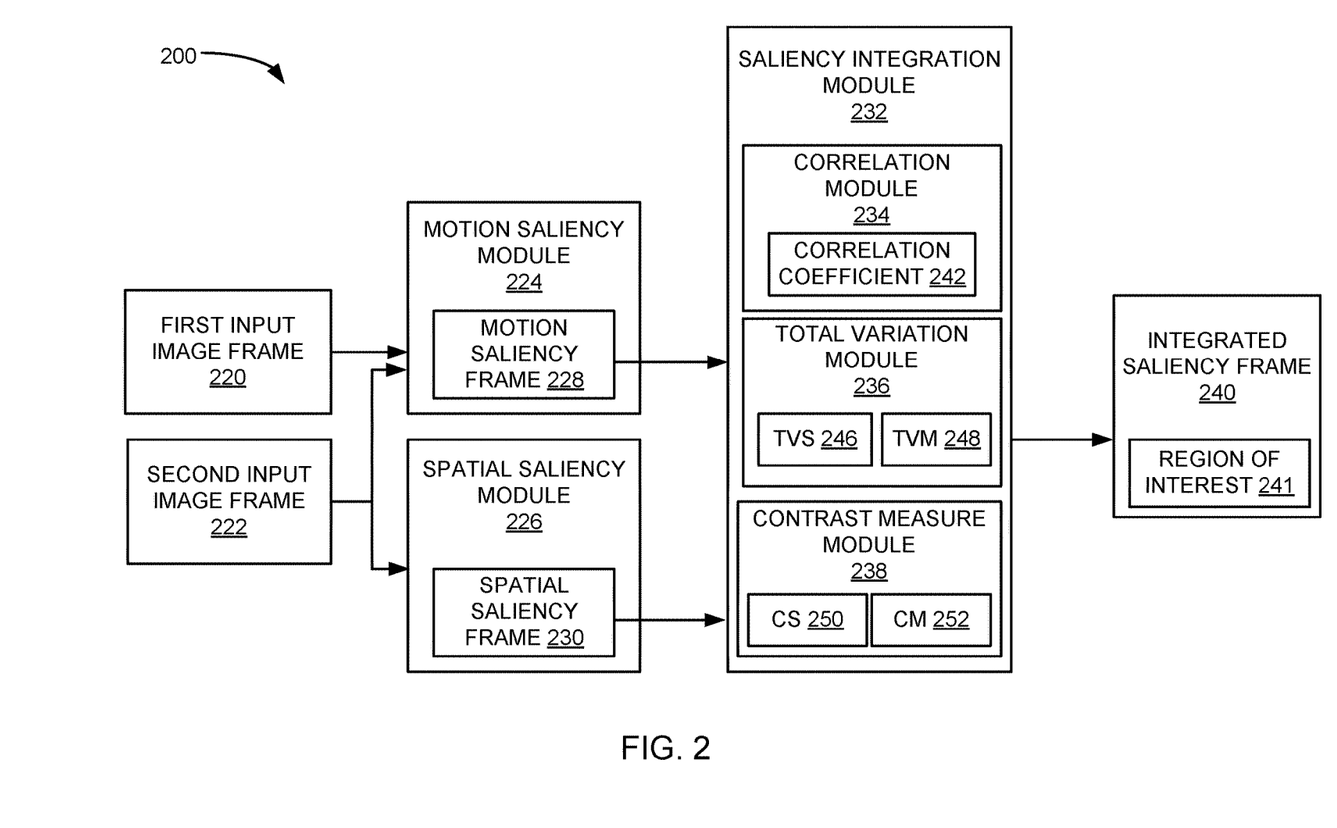
FIG. 2 is a system diagram of the image processing system in a second embodiment of the present invention.

Referring now to FIG. 2, therein is shown a system diagram of the image processing system 200 in a second embodiment of the present invention. In this embodiment, images or video are handled at the level of individual image frames, and multiple image frames can be captured even when the intention of the users is to capture a still image. This is necessary for automatic functions of the camera to work properly such as autofocus, auto white balance, and auto exposure, for example. In order to intelligently determine which portion of a given image frame should be given higher priority, the foreground, or region of interest must be identified. For example, this can be done through an identification of the salient features of any image frame.

Each individual determination of saliency has its own advantages and disadvantages. The saliency determinations can best determine the truly salient feature of an image when combined in an intelligent fashion. For example, a spatial saliency algorithm can detect nonmoving salient objects but has trouble dealing with moving non-salient objects that are part of the foreground. As another example, a motion saliency algorithm can detect salient moving objects, but has trouble with series of images containing a large amount of motion throughout the entire frame and with nonmoving salient objects. It is not enough to simply combine the saliency results; they must be combined in an intelligent fashion.

A first input image frame 220 and a second input image frame 222 can be captured by the capture device 117 of FIG. 1. In this example, processing of the first input image frame 220 and the second input image frame 222 takes place in the image signal processing hardware 114 of FIG. 1 and in various processing subunits of the image signal processing hardware 114. For example, the processing subunits or modules which perform specific functions can be hardware subunits, dedicated circuitry, or modules within the image signal processing hardware 114.

A motion saliency module 224 can compare the first input image frame 220 and the second input image frame 222 in order to generate a motion saliency frame 228. The motion saliency module 224 looks for motion of groups of pixels and can assign values to the groups of pixels, which generally correspond to objects, based on the amount of movement. In other words, the greater the movement of the object, the higher the value assigned to the object within the motion saliency frame 228. For the purposes of this example, the motion saliency frame 228 is a gray level image the same size as the first input image frame 220 and the second input image frame 222. As another example, there can be 256 possible values for each pixel within the motion saliency frame 228. As stated above, the highest values can be assigned to objects which have moved the most between the first input image frame 220 and the second input image frame 222.

A spatial saliency module 226 can utilize the second input image frame 222 in order to generate a spatial saliency frame 230. The spatial saliency module 226 utilizes contrast between adjacent objects in order to determine spatial saliency. For example, the spatial saliency module 226 can look for color contrast and intensity contrast between objects within the second input image frame 222. Based on this contrast, values can be assigned to groups of pixels or objects, with higher values assigned to objects having greater contrast with adjacent objects and with the entirety of the second input image frame 222. For the purposes of this example, the spatial saliency frame 230 is a gray level image the same size as the second input image frame 222. As another example, there can be 256 possible values for each pixel within the spatial saliency frame 230.

A saliency integration module 232 can be coupled to both the motion saliency module 224 and the spatial saliency module 226. The saliency integration module 232 can also contain a number of submodules including a correlation module 234, a total variation module 236, and a contrast measure module 238. The saliency integration module 232 can intelligently combine the motion saliency frame 228 and the spatial saliency frame 230 to generate an integrated saliency frame 240 which identifies the truly salient features of the second input image frame 222. The integrated saliency frame 240 can be used to intelligently determine the region of interest and to intelligently drive autofocus, auto white balance, and auto exposure, for example.

The saliency integration module 232 can utilize the correlation module 234 to calculate a correlation coefficient 242 based on the motion saliency frame 228 and the spatial saliency frame 230. The correlation coefficient 242 quantifies how similar the motion saliency frame 228 and the spatial saliency frame 230 are. The correlation coefficient 242 can be calculated in various ways, but an example is provided below as Equation 1.

$$r = \mathrm{corrcoef}(I_m, I_s) = \frac{\mathrm{cov}(I_s, I_m)}{\sqrt{\mathrm{cov}(I_s, I_s)\mathrm{cov}(I_m, I_m)}} \quad \text{Equation 1}$$

In Equation 1, r stands for the correlation coefficient 242. To the right of r is the indication that the correlation coefficient 242 is based on the motion saliency frame 228 (represented here by $I_m$) and the spatial saliency frame 230 (represented here by $I_s$). This is equated to the covariance between the motion saliency frame 228 and the spatial saliency frame 230 divided by the square root of the covariance of each multiplied by the other. In this example, covariance is signified by cov, and it is defined as Equation 1A below.

$$\mathrm{cov}(I, J) = \frac{1}{N-1} \sum_i (I[i] - \mu_I)(J[i] - \mu_J) \quad \text{Equation 1A}$$

In this example, I and J are the inputs to the covariance equation. In Equation 1, these would be the motion saliency frame 228 ($I_m$) and the spatial saliency frame 230 ($I_s$) such that the equation would now read "cov($I_m$, $I_s$)= . . . ". N is the total number of pixels in I or J (or in this example $I_m$ or $I_s$). $\mu_I$ and $\mu_J$ represent the mean value of image I and J, respectively.

The saliency integration module 232 can use the total variation module 236 to calculate a spatial total variation 246 and a motion total variation 248 which describe the total variation within the spatial saliency frame 230 and the motion saliency frame 228, respectively. In the following example equations, any variable based on the spatial saliency frame 230 is indicated by a subscript s and anything based on the motion saliency frame 228 is indicated by a subscript m. The total variation describes how much pixels within a given image vary from each other. For example, the spatial total variation 246 ($TV_s$) can be calculated by using Equation 2 below.

$$TV_s = \frac{1}{N} \sum_{x,y} (|\mathrm{grad}_x(I_s)[x][y]| + |\mathrm{grad}_y(I_s)[x][y]|) \quad \text{Equation 2}$$

Any variables described above continue to keep their meaning unless otherwise stated. In this example, $\mathrm{grad}_x$ denotes a gradient in the x direction and $\mathrm{grad}_y$ a gradient in the y direction. These gradients are calculated by the example equations below marked as Equation 2A and Equation 2B. Within these equations, $N_x$ is the number of columns of pixels of the image $I_s$ and $N_y$ is the number of rows of pixels of $I_s$.

$$\mathrm{grad}_x(I_s)[x][y] = \begin{cases} I_s[x][y] - I_s[x+1][y], & 0 \le x < N_x - 1 \\ 0, & \text{else} \end{cases} \quad \text{Equation 2A}$$

$$\mathrm{grad}_y(I_s)[x][y] = \begin{cases} I_s[x][y] - I_s[x][y+1], & 0 \le y < N_y - 1 \\ 0, & \text{else} \end{cases} \quad \text{Equation 2B}$$

Equivalent equations can be used to calculate the motion total variation 248 ($TV_m$).

The saliency integration module 232 can also use the contrast measure module 238 to calculate a spatial contrast measure 250 and a motion contrast measure 252 which describe the contrast measure of the spatial saliency frame 230 and the motion saliency frame 228, respectively. The spatial contrast measure 250 (in this example, $C_s$) can be calculated by the example Equation 3 below.

$$C_s = \sqrt{\frac{1}{N} \sum (I_s[i] - \mu_s)^2} \qquad \text{Equation 3}$$

For clarity, $\mu_s$ denotes the mean value of $I_s$, and the motion contrast measure 252 (in this example, $C_m$) can be calculated in a similar manner. The integrated saliency frame 240 contains an area determined to be the foreground, or a region of interest 241. The details of how the motion saliency frame 228 and the spatial saliency frame 230 are combined to create the integrated saliency frame 240 with the region of interest 241 intelligently determined are described in FIG. 3.

It has been discovered that the calculation of respective values by the correlation module 234, the total variation module 236, and the contrast measure module 238 provides greater accuracy to the determination of the region of interest 241 in the integrated saliency frame and consequently greater accuracy when determining how the utilize autofocus, which creates better pictures or video. For example, with an accurate determination of the region of interest 241 rather than a simple combination of the motion saliency frame 228 and the spatial saliency frame 230, the true object of interest within a given image frame can be determined so that the region of interest 241 can be in focus as well as properly exposed (so all detail can be seen) and have proper white balance (so colors are accurate to real life). Without an accurate determination of the region of interest 241, it becomes more likely that the true object of interest in an image frame can be out of focus or over- or under-exposed, leading to an unsatisfactory final image.

Figure 3:
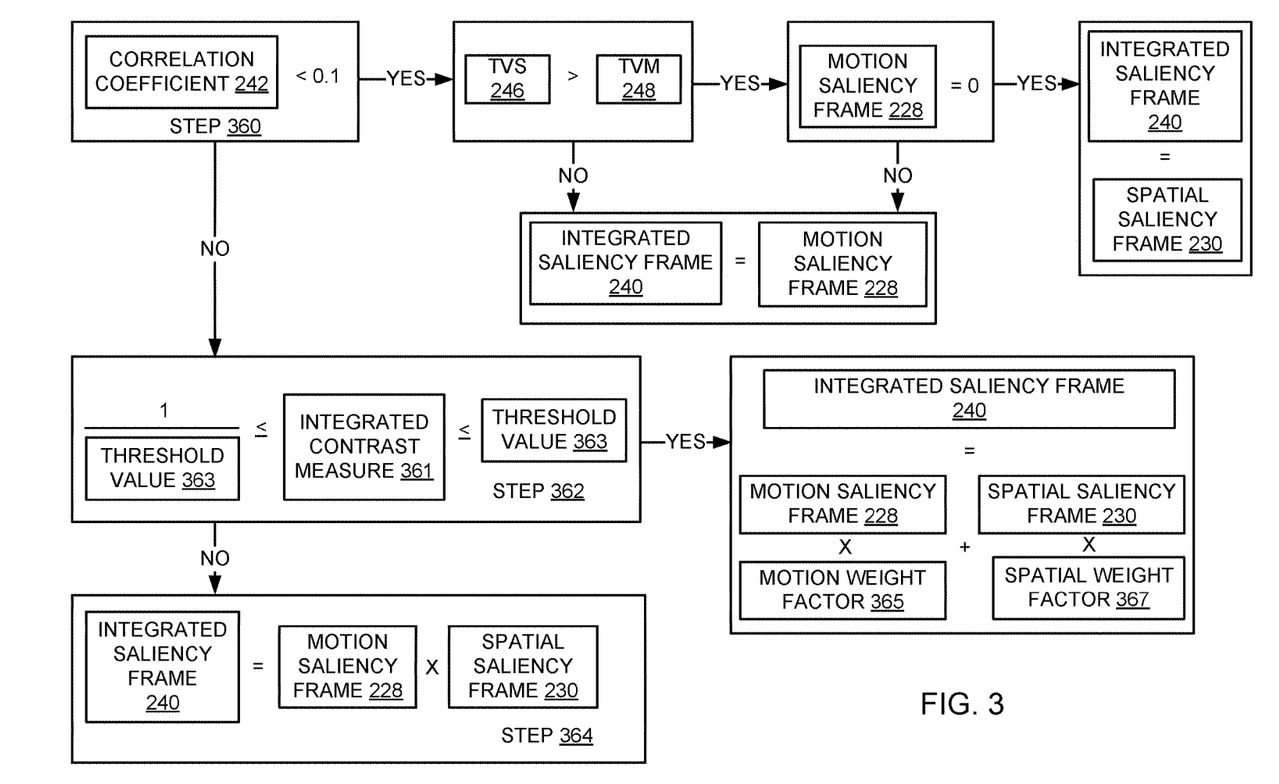
FIG. 3 is an example flow chart which describes how the saliency integration module of FIG. 2 generates the integrated saliency frame.

Referring now to FIG. 3, therein is shown an example flow chart which describes how the saliency integration module 232 of FIG. 2 generates the integrated saliency frame 240. The saliency integration module 232 can use the correlation coefficient 242 as calculated by the correlation module 234 in a step 360 of an innovative process to combine the saliency results of the motion saliency frame 228 and the spatial saliency frame 230. In order for the process to work properly, the steps should be taken in order.

When the correlation coefficient 242 is calculated, it is checked to see if the result is less than 0.1 at the step 360. If the correlation coefficient 242 is less than 0.1, then a check is made to see if the spatial total variation 246 is greater than the motion total variation 248. If both these conditions are met, then another check is made to see if the motion saliency frame 228 contains any information or whether the motion saliency frame 228 is blank. As noted above, in this example there are 256 possible values for each pixel dependent on how salient the pixel or groups of pixels are. If there are no, for example, spatially salient features in an image frame, then the spatial saliency frame 230 would have all zero values; the spatial saliency frame 230 would be blank. If the motion saliency frame 228 is not blank, then the integrated saliency frame 240 is determined to be the same as the motion saliency frame 228; the spatial saliency frame 230 is dropped from the determination. If, on the other hand, the motion saliency frame 228 is blank, then the integrated saliency frame 240 is determined to be the same as the spatial saliency frame 230; the motion saliency frame 228 is dropped from the determination. If the spatial total variation 246 is not greater than the motion total variation 248, then again the motion saliency frame 228 is dropped from the determination and the integrated saliency frame 240 is determined to be the same as the spatial saliency frame 230.

It has been discovered that the various levels of threshold checks utilizing the correlation coefficient 242, the spatial total variation 246, and the motion total variation 248, as well as values within the motion saliency frame 228, allows for an intelligent and accurate determination of what information should be present in the integrated saliency frame 240 and the region of interest 241 within the integrated saliency frame 240. The intelligent determination leads to a more balanced and focused final image. The various checks intelligently determine whether to keep or discard information within the motion saliency frame 228 and the spatial saliency frame 230, as the checks determine whether the information is relevant to a determination of the region of interest 241. For example, dropping the spatial saliency frame 230 from the determination when the spatial total variation 246 is greater than the motion total variation 248 effectively means that if a picture is too "busy" with too many contrasting colors, it is determined that objects in motion are generally of more interest than the many areas within the spatial saliency frame 230. Thus, the spatial saliency frame 230 information is dropped from the generation of the integrated saliency frame 240. In this manner, an accurate determination is made of the region of interest 241.

If it is determined that the correlation coefficient 242 is not less than 0.1, then the image processing system 200 moves on to the next step (step 362). In this step, a determination is made as to whether an integrated contrast measure 361 is between one over a threshold value 363 and the threshold value 363 (T). The integrated contrast measure 361 ($p_0$) can be described by Equation 4, for example.

$$p_0 = \frac{C_m}{C_s} \qquad \text{Equation 4}$$

In Equation 4 above, the integrated contrast value 361 is equal to the motion contrast measure 252 of FIG. 2 divided by the spatial contrast measure 250 of FIG. 2. The determination made in the step 362 can be described by Equation 5.

$$\frac{1}{T} \leq \frac{C_m}{C_s} \leq T \qquad \text{Equation 5}$$

The threshold value 363 sets boundaries on the integrated contrast value 361. For the purposes of this example, the threshold value 363 (T) is set to three meaning that the integrated contrast value 361 needs to be between one over three and three in order to proceed to the next portion of this step. If the integrated contrast value 361 falls within the threshold values, then a determination of the integrated saliency frame 240 can be equated to the motion saliency frame 228 multiplied by a motion weight factor 365 the product of which is added to the product of the spatial saliency frame 230 multiplied by a spatial weight factor 367. The motion weight factor 365 and the spatial weight factor 367 are dynamically determined and provide an appropriate waiting to either the motion saliency or the spatial saliency when generating the integrated saliency frame 240. Where the motion weight factor 365 is represented by p and the spatial weight factor 367 is represented by q, Equation 6 shows that the integrated saliency frame 240, represented here by "I" is as below.

$$I = p*I_m + q*I_s \qquad \text{Equation 6:}$$

The motion weight factor 365 and the spatial weight factor 367 are determined dynamically by looking at the integrated contrast value 361. The method for calculating the motion weight factor 365 and the spatial weight factor 367 can be seen example equations labeled Equation 7 and Equation 8 below.

$$\text{if } p_0 > 1, \text{ then } p = \frac{p_0 + 1}{4}, q = 1 - p \quad \text{Equation 7}$$

$$\text{else } q = \frac{1/p_0 + 1}{4}, p = 1 - q \quad \text{Equation 8}$$

It has been discovered that the approach of dynamically calculating the motion weight factor 365 and the spatial weight factor 367 based on the integrated contrast value 361 and how the weight factors relate to each other provides accurate and appropriate waiting of saliency of any given object within an image frame. For example, because the integrated contrast value 361 is determined by the motion contrast measure 252 divided by the spatial contrast measure 250, this will lead to a larger value for the integrated contrast measure 361 which per Equation 7 will lead to a larger value for the motion weight factor 365 ($p$) and a correspondingly smaller value for the spatial weight factor 367 ($q$). Per Equation 8, the inverse is true when the spatial contrast measure 250 is larger than the motion contrast measure 252. The equations show that the weighting factors are changed as a function of the magnitude of the spatial contrast measure 250 and the motion contrast measure 252, but not as a simple direct relationship. It has been determined that this approach provides a more accurate weight to the motion saliency frame 228 and the spatial saliency frame 230 when these image frames are combined.

If the integrated contrast value 361 does not fall within the threshold values as detailed above, then, and only then, is the integrated saliency frame 240 determined by multiplication of the motion saliency frame 228 by the spatial saliency frame 230. It has been discovered that this multiplication has the effect of zeroing out values of any pixel where there is not some salience within both the motion saliency frame 228 and the spatial saliency frame 230. Effectively, this amplifies combined saliency and suppresses low saliency values. This cannot be done through simple addition of the spatial saliency frame 230 and the motion saliency frame 228 alone. This can be represented simply by Equation 9 below. In the below example equation, the motion saliency frame 228 is represented by "Im" and the spatial saliency frame 230 is represented by "Is".

$$I = Im*Is \quad \text{Equation 9:}$$

No matter the method by which the integrated saliency frame 240 is determined, the result can be normalized. An example of the normalization is given by Equation 10 below.

$$I = I/\max(I)*255 \quad \text{Equation 10:}$$

It has been discovered that the saliency integration module 232 preceding in an orderly manner through the step 360, the step 362, and the step 364 provides the image processing system 200 with an accurate and effective method with which to determine within a given image or video the best candidate for the region of interest 241 of FIG. 2, which allows the image processing system 200 to best utilize automatic features such as autofocus, auto white balance, and auto exposure, among others. The orderly approach utilizing various submodules within the saliency integration module 232 allows for the orderly determination of what is considered background within an image or video and what is considered foreground, or the region of interest 241, for example.

Thus, it has been discovered that the image processing system 200 of the present invention furnishes important and heretofore unknown and unavailable solutions, capabilities, and functional aspects for effectively and accurately determining a region of interest for the purpose of determining where to use automatic camera functions such as autofocus, auto white balance, and auto exposure.

Figure 4:
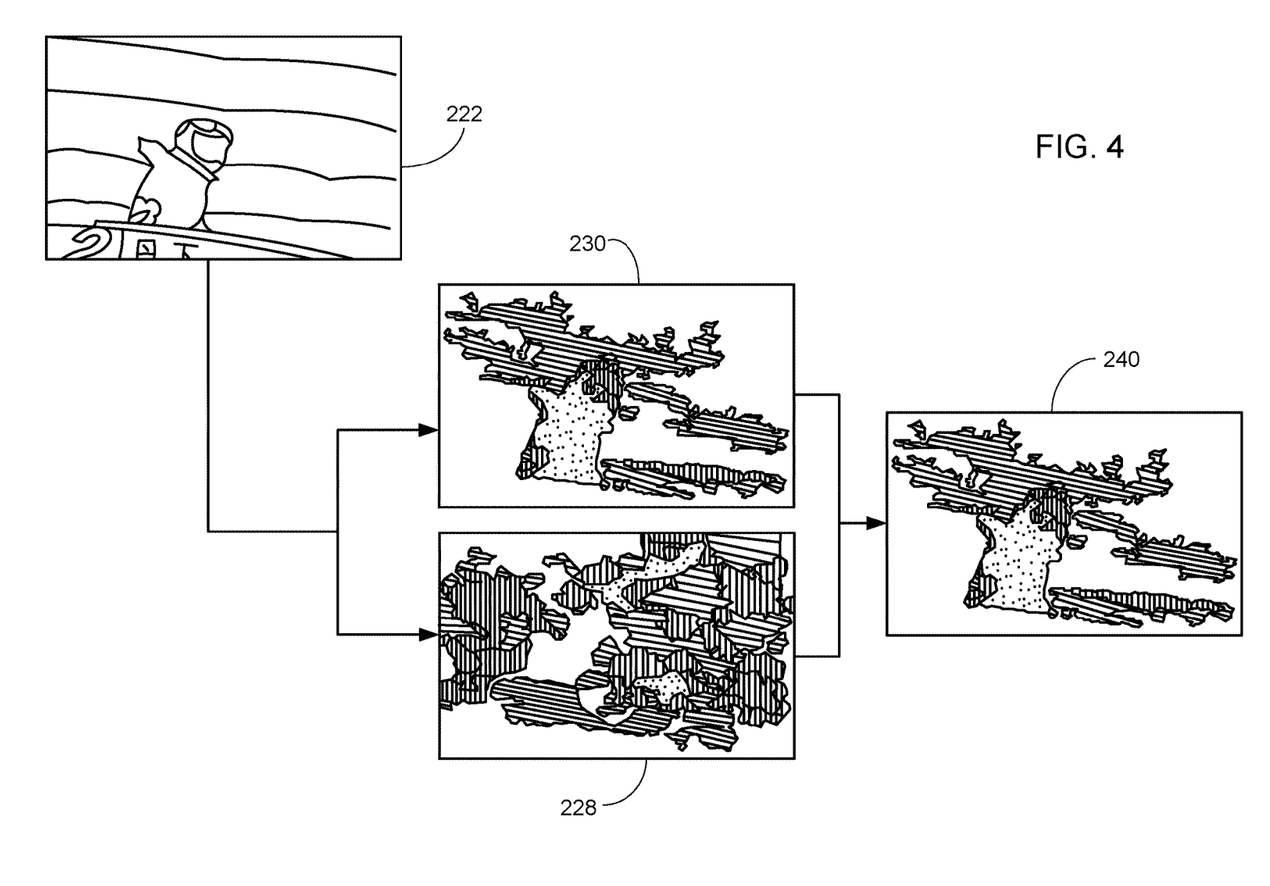
FIG. 4 is an example of the image processing system operating while capturing a boat race.

Referring now to FIG. 4, therein is shown an example of the image processing system 200 operating while capturing a boat race. Due to the limitations of line drawings, features have been greatly simplified from the original color photographs which were used to show the image processing system 200 in action. The drawings used in this figure are for illustrative purposes only. In the second input image frame 222, which is shown here, a boat racer can be seen with a background of water. In order for the image processing system 200 to determine what the foreground is and what the background is, both the motion saliency frame 228 and the spatial saliency frame 230 must be generated.

Because gradients and shading cannot be shown in line drawings, areas with no information are shown as blank and areas with lighter crosshatching and/or dots indicating brighter areas which correspond generally to higher values of saliency. Correspondingly, heavier crosshatching indicates darker areas which indicate lower levels of saliency. This is for illustration only, and what is shown has been greatly simplified for clarity. The spatial saliency frame 230 shows areas of high contrast with both the driver of the boat and portions of the water where sunlight reflecting off the water having spatial saliency. The driver is mostly given a very high spatial saliency value as indicated by the dots within the area corresponding to the driver. At the same time, the motion saliency frame 228 shows that most of the frame is in motion and differs from the previous frame.

The saliency integration module 232 intelligently combines the motion saliency frame 228 and the spatial saliency frame 230. During this process, it becomes clear that the spatial saliency is more important than motion saliency meaning that the information from the motion saliency frame 228 is largely discarded. The saliency integration module 232 then generates the integrated saliency frame 240 to be largely the same as the spatial saliency frame 230. The image processing system 100 or 200 then understands that the driver of the boat has the highest saliency and is the portion of the image which can be considered the region of interest 241 of FIG. 2, for example. This means that the autofocus mechanism will focus on the region of interest 241; the autofocus mechanism will focus on the driver, ultimately resulting in a better image because the most salient object within the image is in focus and exposed and colored properly due to auto white balance and auto exposure.

Figure 5:
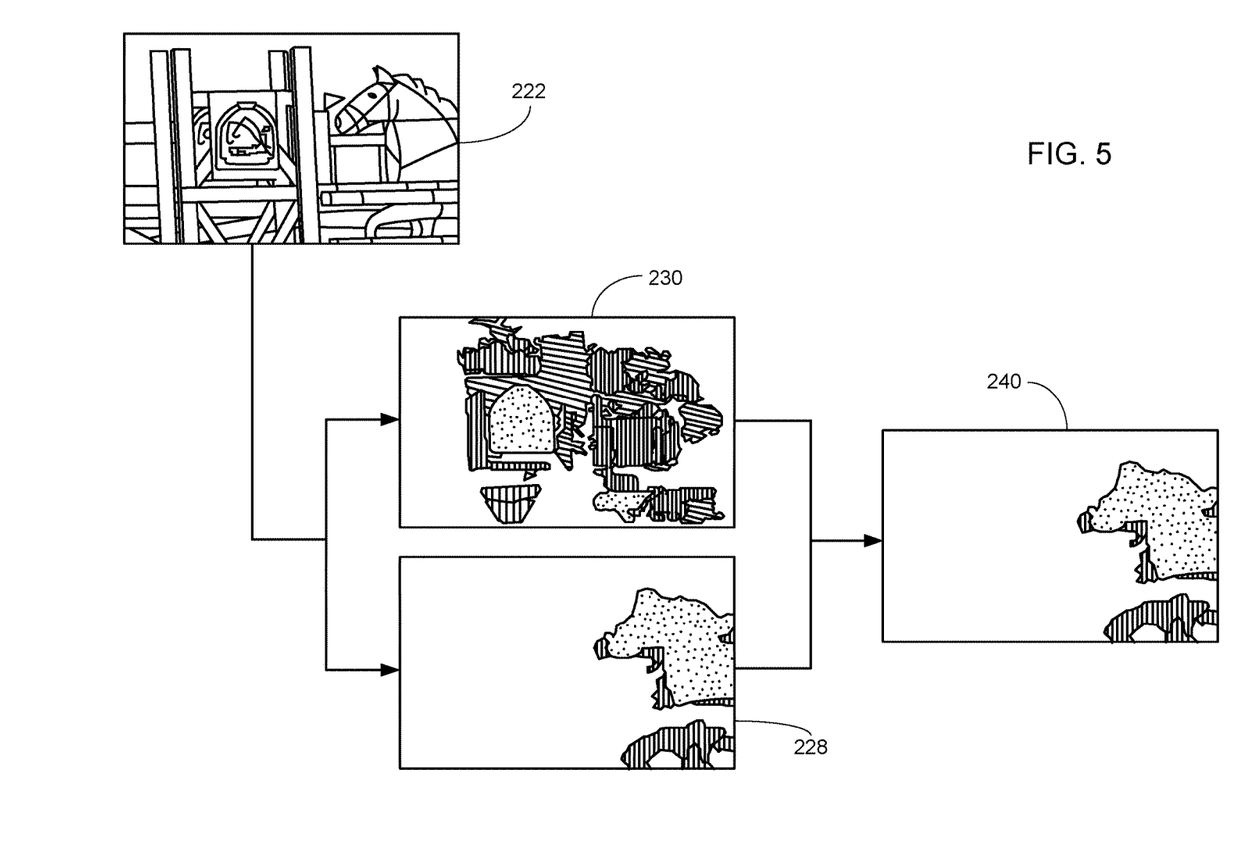
FIG. 5 is an example of the image processing system operating while capturing an equestrian event.

Referring now to FIG. 5, therein is shown an example of the image processing system 200 operating while capturing an equestrian event. Due to the limitations of line drawings, features have been greatly simplified from the original color photographs which were used to show the image processing system 200 in action. The drawings used in this figure are for illustrative purposes only. In the second input image frame 222, which is shown here, a horse can be seen behind some equestrian structures which are closer to the camera. In order for the image processing system 200 to determine what the foreground is and what the background is, both the motion saliency frame 228 and the spatial saliency frame 230 must be generated.

Because gradients and shading cannot be shown in line drawings, areas with no information are shown as blank and areas with lighter crosshatching and/or dots indicating brighter areas which correspond generally to higher values of saliency. Correspondingly, heavier crosshatching indicates darker areas which indicate lower levels of saliency. This is for illustration only, and what is shown has been greatly simplified for clarity. The spatial saliency frame 230 shows areas of high contrast all over the frame. At the same time, the motion saliency frame 228 shows that only the horse is in motion.

The saliency integration module 232 can intelligently combine the motion saliency frame 228 and the spatial saliency frame 230. During this process, it becomes clear that the motion saliency is more important than the spatial saliency, meaning that the information from the spatial saliency frame 230 is largely discarded. The saliency integration module 232 then generates the integrated saliency frame 240 to be largely the same as the motion saliency frame 228. The image processing system 100 or 200 then understands that the moving horse has the highest saliency and is the portion of the image which can be considered the region of interest 241 of FIG. 2, for example. This means that all automatic functions such as autofocus, auto white balance, and auto exposure, will focus on the region of interest 241; this will ultimately result in a better image because the most salient object (the horse) within the image will be in focus and exposed properly.

It has been discovered that the saliency integration module 232 intelligently combining the motion saliency frame 228 and the spatial saliency frame 230 provides for better determination of the region of interest 241 and a better image overall. Especially in this example, without an intelligent determination of the most salient object within an image frame, a camera could easily be fooled by the fact that the structures are closer to the camera and have very high contrast leading the focus to be on the structures rather than the horse, which is the object in the image most people would consider to be the region of interest 241. Without the saliency integration module 232, the horse would likely be out of focus as well as potentially being over or under exposed leading to a picture with nothing of interest within it.

Figure 6:
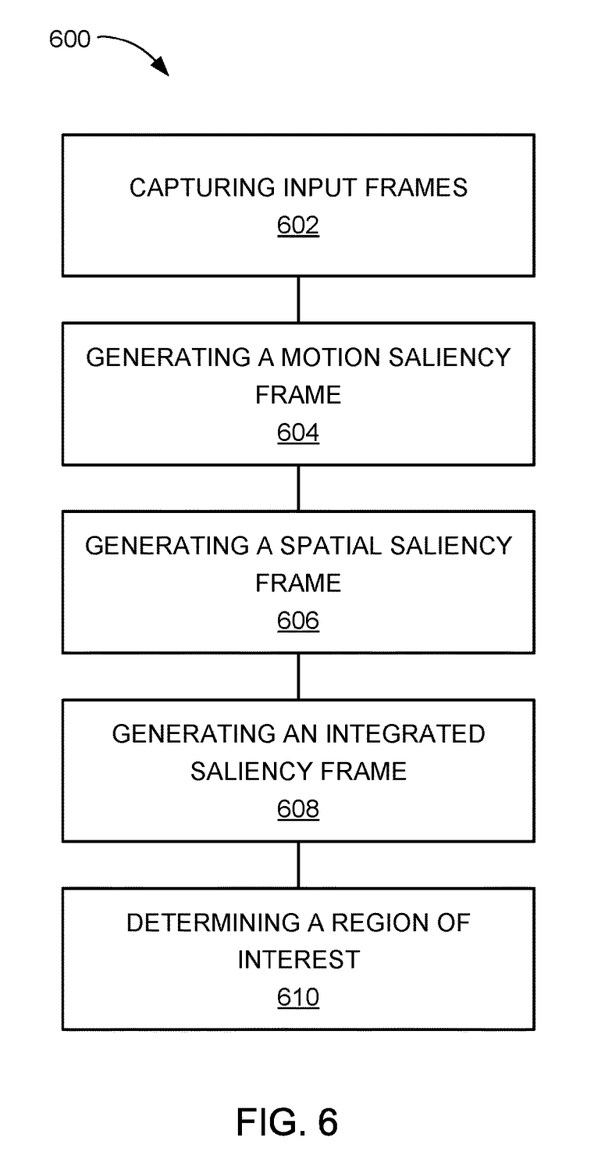
FIG. 6 is a flow chart of a method of operation of an image processing system in a further embodiment of the present invention.

Referring now to FIG. 6, therein is shown a flow chart of a method 600 of operation of an image processing system in a further embodiment of the present invention. The method 600 includes: capturing a first input image frame and a second input image frame with a capture device in a block 602; generating a motion saliency frame based on the first input image frame and the second input image frame in a block 604; generating a spatial saliency frame based on the second input image frame in a block 606; generating the integrated saliency frame based on the combination of the motion saliency frame and the spatial saliency frame in a block 608; and determining a region of interest within the integrated saliency frame in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   capturing a first input image frame and a second input image frame with a capture device;
   generating a motion saliency frame based on the first input image frame and the second input image frame;
   generating a spatial saliency frame based on the second input image frame;
   generating the integrated saliency frame based on the combination of the motion saliency frame and the spatial saliency frame; and
   determining a region of interest within the integrated saliency frame.

2. The method as claimed in claim 1 further comprising calculating a correlation coefficient of the motion saliency frame and the spatial saliency frame.

3. The method as claimed in claim 1 further comprising:
   calculating a spatial total variation of the spatial saliency frame; and
   calculating a motion total variation of the motion saliency frame.

4. The method as claimed in claim 1 further comprising:
   calculating a spatial contrast measure of the spatial saliency frame; and
   calculating a motion contrast measure of the motion saliency frame.

5. The method as claimed in claim 1 further comprising:
   calculating a spatial contrast measure of the spatial saliency frame;
   calculating a motion contrast measure of the motion saliency frame; and
   calculating an integrated contrast measure based on the spatial contrast measure and the motion contrast measure.

6. A method of operation of an image processing system comprising:
   capturing a first input image frame and a second input image frame with a capture device;
   generating a motion saliency frame based on the first input image frame and the second input image frame;
   generating a spatial saliency frame based on the second input image frame;
   calculating a correlation coefficient of the motion saliency frame and the spatial saliency frame;
   calculating a spatial total variation of the spatial saliency frame;
   calculating a motion total variation of the motion saliency frame;
   generating the integrated saliency frame based on the value of the correlation coefficient; and determining a region of interest within the integrated saliency frame.

7. The method as claimed in claim 6 wherein generating the integrated saliency frame includes generating the integrated saliency frame based on the correlation coefficient being less than 0.1 and the spatial total variation being larger than the motion total variation.

8. The method as claimed in claim 6 further comprising:
calculating a spatial contrast measure of the spatial saliency frame;
calculating a motion contrast measure of the motion saliency frame;
calculating an integrated contrast measure based on the spatial contrast measure and the motion contrast measure; and
generating the integrated saliency frame based on the value of the integrated contrast measure.

9. The method as claimed in claim 6 further comprising:
calculating a spatial contrast measure of the spatial saliency frame;
calculating a motion contrast measure of the motion saliency frame;
calculating an integrated contrast measure based on the spatial contrast measure and the motion contrast measure; and
wherein:
generating the integrated saliency frame includes generating the integrated saliency frame based on the correlation coefficient being greater than 0.1, the integrated contrast measure being greater than a threshold value, and the elementwise product of the motion saliency frame and the spatial saliency frame.

10. The method as claimed in claim 6 further comprising:
calculating a spatial contrast measure of the spatial saliency frame;
calculating a motion contrast measure of the motion saliency frame;
calculating an integrated contrast measure based on the spatial contrast measure and the motion contrast measure;
determining the integrated contrast measure to be between a threshold value and one divided by the threshold value; and
wherein:
generating the integrated saliency frame includes generating the integrated saliency frame based on the correlation coefficient being greater than 0.1 and the sum of the motion saliency frame multiplied by a motion weight factor and the spatial saliency frame multiplied by a spatial weight factor.

11. An image processing system comprising:
a capture device for capturing a first input image frame and a second input image frame;
a motion saliency module, coupled to the capture device, for generating a motion saliency frame based on the first input image frame and the second input image frame;
a spatial saliency module, coupled to the capture device, for generating a spatial saliency frame based on the second input image frame; and
a saliency integration module, coupled to the motion saliency module and the spatial saliency module, for generating the integrated saliency frame based on the combination of the motion saliency frame and the spatial saliency frame, and for determining a region of interest within the integrated saliency frame.

12. The system as claimed in claim 11 further comprising a correlation module within the saliency integration module for calculating a correlation coefficient of the motion saliency frame and the spatial saliency frame.

13. The system as claimed in claim 11 further comprising a total variation module within the saliency integration module for calculating a spatial total variation of the spatial saliency frame and for calculating a motion total variation of the motion saliency frame.

14. The system as claimed in claim 11 further comprising a contrast measure module within the saliency integration module for calculating a spatial contrast measure of the spatial saliency frame and for calculating a motion contrast measure of the motion saliency frame.

15. The system as claimed in claim 11 wherein the saliency integration module is for determining a region of interest within the integrated saliency frame is for effective implementation of automatic focus based on the region of interest.

16. The system as claimed in claim 11 further comprising:
a correlation module within the saliency integration module for calculating a correlation coefficient of the motion saliency frame and the spatial saliency frame;
a total variation module within the saliency integration module for calculating a spatial total variation of the spatial saliency frame and for calculating a motion total variation of the motion saliency frame;
a contrast measure module within the saliency integration module for calculating a spatial contrast measure of the spatial saliency frame and for calculating a motion contrast measure of the motion saliency frame; and
wherein:
the saliency integration module is for calculating an integrated contrast measure based on the spatial contrast measure and the motion contrast measure.

17. The system as claimed in claim 16 wherein the saliency integration module is for generating the integrated saliency frame based on the correlation coefficient being less than 0.1 and the spatial total variation being larger than the motion total variation.

18. The system as claimed in claim 16 wherein the saliency integration module is for generating the integrated saliency frame based on the value of the integrated contrast measure.

19. The system as claimed in claim 16 wherein the saliency integration module is for generating the integrated saliency frame based on the correlation coefficient being greater than 0.1, the integrated contrast measure being greater than a threshold value, and the elementwise product of the motion saliency frame and the spatial saliency frame.

20. The system as claimed in claim 16 wherein the saliency integration module is for determining the integrated contrast measure to be between a threshold value and one divided by the threshold value and for generating the integrated saliency frame based on the correlation coefficient being greater than 0.1 and the sum of the motion saliency frame multiplied by a motion weight factor and the spatial saliency frame multiplied by a spatial weight factor.

* * * * *